US012760755B2

(12) United States Patent
Vargo

(10) Patent No.: US 12,760,755 B2
(45) Date of Patent: Oct. 13, 2026

(54) COUPLING MECHANISM FOR A MODULAR SYSTEM

(71) Applicant: Milwaukee Electric Tool Corporation, Brookfield, WI (US)

(72) Inventor: Matthew Vargo, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 888 days.

(21) Appl. No.: 18/148,159

(22) Filed: Dec. 29, 2022

(65) Prior Publication Data

US 2023/0151833 A1 May 18, 2023

Related U.S. Application Data

(63) Continuation of application No. PCT/US2022/080020, filed on Nov. 17, 2022.

(60) Provisional application No. 63/280,923, filed on Nov. 18, 2021.

(51) Int. Cl.
*F16B 2/04* (2006.01)
*B65D 21/08* (2006.01)
*B25H 3/02* (2006.01)

(52) U.S. Cl.
CPC .............. *F16B 2/04* (2013.01); *B65D 21/083* (2013.01); *B25H 3/021* (2013.01)

(58) Field of Classification Search
None
See application file for complete search history.

(56) References Cited

U.S. PATENT DOCUMENTS

| | | | | |
|---|---|---|---|---|
| 1,240,705 | A | 9/1917 | Grode | |
| 3,424,334 | A | 1/1969 | Goltz | |
| 3,891,172 | A | 6/1975 | Einhorn | |
| 4,653,716 | A | 3/1987 | Sakaguchi | |
| 5,039,267 | A * | 8/1991 | Wollar | F16B 21/08 411/510 |
| 5,061,112 | A * | 10/1991 | Monford, Jr. | F16B 21/183 403/DIG. 1 |
| D342,005 | S | 12/1993 | Forsberg | |
| 5,277,387 | A | 1/1994 | Lewis et al. | |
| 5,572,776 | A | 11/1996 | Murphy et al. | |
| 5,715,951 | A | 2/1998 | Dembicks | |

(Continued)

FOREIGN PATENT DOCUMENTS

| | | |
|---|---|---|
| CN | 2496800 | 6/2002 |
| CN | 202161280 | 3/2012 |

(Continued)

OTHER PUBLICATIONS

International Search Report and Written Opinion for International Application No. PCT/US2022/080020, dated Mar. 16, 2023, 10 pages.

(Continued)

*Primary Examiner* — Matthew R Mcmahon
(74) *Attorney, Agent, or Firm* — Reinhart Boerner Van Deuren s.c.

(57) ABSTRACT

A coupling mechanism for a utility system is provided, the coupling mechanism coupling an object with a modular system, such as a modular storage system. The coupling mechanism includes arms that extend from a projection. The arms are configured to engage under ribs within the modular system, such as the modular storage system.

16 Claims, 6 Drawing Sheets

(56) References Cited

U.S. PATENT DOCUMENTS

| | | | | |
|---|---|---|---|---|
| 5,725,107 | A | 3/1998 | Dembicks | |
| 5,855,284 | A | 1/1999 | Dembicks | |
| 5,890,613 | A | 4/1999 | Williams | |
| 5,897,001 | A | 4/1999 | Dembicks | |
| 6,652,206 | B2 * | 11/2003 | Heflin | F16B 19/1081 411/908 |
| 6,932,312 | B1 | 8/2005 | Chen | |
| 6,983,946 | B2 | 1/2006 | Sullivan et al. | |
| D547,048 | S | 7/2007 | Conway et al. | |
| 7,614,836 | B2 * | 11/2009 | Mohiuddin | B60R 13/0206 411/510 |
| D636,657 | S | 4/2011 | Quinlan et al. | |
| D642,039 | S | 7/2011 | Forsberg et al. | |
| D656,883 | S | 4/2012 | Patalak et al. | |
| D666,134 | S | 8/2012 | Patalak et al. | |
| 8,267,363 | B2 | 9/2012 | Begic et al. | |
| 8,485,482 | B2 | 7/2013 | Patalak et al. | |
| 8,528,871 | B2 | 9/2013 | Begic et al. | |
| 8,740,010 | B1 | 6/2014 | Page | |
| 8,936,420 | B2 * | 1/2015 | Scroggie | B23P 19/08 411/45 |
| 9,375,835 | B1 | 6/2016 | Lin | |
| D771,476 | S | 11/2016 | Prince et al. | |
| 9,615,722 | B2 | 4/2017 | Mesa et al. | |
| D796,750 | S | 9/2017 | Hederstierna et al. | |
| 9,919,657 | B2 * | 3/2018 | Benedict | B60R 9/06 |
| 10,052,012 | B2 | 8/2018 | Mesa et al. | |
| 10,125,919 | B2 | 11/2018 | Forsberg | |
| 10,150,628 | B2 * | 12/2018 | Wolf | B65C 3/08 |
| 10,165,927 | B2 | 1/2019 | Mesa et al. | |
| 10,293,960 | B2 * | 5/2019 | Shafer | F16B 2/12 |
| 10,405,676 | B1 | 9/2019 | Underwood | |
| 10,463,226 | B2 | 11/2019 | Mesa et al. | |
| 10,583,962 | B2 | 3/2020 | Brunner et al. | |
| 10,634,180 | B2 * | 4/2020 | Sawada | F16B 21/084 |
| 10,668,871 | B2 | 6/2020 | Yon | |
| 10,750,833 | B2 | 8/2020 | Burchia | |
| 10,772,444 | B2 | 9/2020 | Stas | |
| 10,774,864 | B2 * | 9/2020 | Shinoda | B60R 13/0206 |
| 11,040,614 | B2 * | 6/2021 | Stancu | B60K 15/0409 |
| 11,898,594 | B2 * | 2/2024 | Gädecke | F16B 2/22 |
| 2003/0139080 | A1 | 7/2003 | Lafragette et al. | |
| 2007/0138041 | A1 | 6/2007 | Welsh | |
| 2011/0260588 | A1 | 10/2011 | Lin | |
| 2011/0303798 | A1 | 12/2011 | Bader et al. | |
| 2013/0127129 | A1 | 5/2013 | Bensman et al. | |
| 2013/0334383 | A1 | 12/2013 | Begic et al. | |
| 2014/0265440 | A1 | 9/2014 | Chen et al. | |
| 2016/0325928 | A1 * | 11/2016 | Lepek | B65G 1/0471 |
| 2017/0058929 | A1 | 3/2017 | Shafer et al. | |
| 2017/0166352 | A1 | 6/2017 | Hoppe et al. | |
| 2018/0256766 | A1 | 9/2018 | Gareiss et al. | |
| 2018/0291942 | A1 | 10/2018 | Shinoda | |
| 2019/0225371 | A1 | 7/2019 | Hoppe et al. | |
| 2020/0147781 | A1 | 5/2020 | Squiers et al. | |
| 2020/0165036 | A1 | 5/2020 | Squiers et al. | |
| 2023/0122425 | A1 | 4/2023 | Camp et al. | |

FOREIGN PATENT DOCUMENTS

| | | | | |
|---|---|---|---|---|
| CN | 113573985 | | 10/2021 | |
| DE | 2947276 | A * | 6/1980 | F16B 19/1081 |
| DE | 202014103695 | | 12/2014 | |
| EP | 0507721 | | 12/1994 | |
| EP | 1724069 | A2 | 11/2006 | |
| EP | 2537641 | B1 | 9/2016 | |
| EP | 2338650 | B1 | 10/2016 | |
| GB | 2211486 | | 7/1989 | |
| JP | 2002106519 | A * | 4/2002 | |
| WO | WO8500132 | | 1/1985 | |
| WO | WO9300202 | | 1/1993 | |
| WO | WO05042212 | | 5/2005 | |
| WO | WO2014/099444 | | 6/2014 | |
| WO | WO2014/125484 | | 8/2014 | |

OTHER PUBLICATIONS

Inter Partes Review No. 2024-01400, "Petition for Inter Partes Review of U.S. Pat. No. 11,365,026" Filed Sep. 17, 2024, 147 pages.
Exhibit 1001 in Petition for Inter Partes Review of U.S. Pat. No. 11,365,026 Filed Sep. 17, 2024, 66 pages.
Exhibit 1002 in Petition for Inter Partes Review of U.S. Pat. No. 11,365,026 Filed Sep. 17, 2024, 324 pages.
Exhibit 1003 in Petition for Inter Partes Review of U.S. Pat. No. 11,365,026 Filed Sep. 17, 2024, 139 pages.
Exhibit 1004 in Petition for Inter Partes Review of U.S. Pat. No. 11,365,026 Filed Sep. 17, 2024, 17 pages.
Exhibit 1005 in Petition for Inter Partes Review of U.S. Pat. No. 11,365,026 Filed Sep. 17, 2024, 9 pages.
Exhibit 1006 in Petition for Inter Partes Review of U.S. Pat. No. 11,365,026 Filed Sep. 17, 2024, 21 pages.
Exhibit 1007 in Petition for Inter Partes Review of U.S. Pat. No. 11,365,026 Filed Sep. 17, 2024, 16 pages.
Exhibit 1008 in Petition for Inter Partes Review of U.S. Pat. No. 11,365,026 Filed Sep. 17, 2024, 31 pages.
Exhibit 1009 in Petition for Inter Partes Review of U.S. Pat. No. 11,365,026 Filed Sep. 17, 2024, 6 pages.
Exhibit 1010 in Petition for Inter Partes Review of U.S. Pat. No. 11,365,026 Filed Sep. 17, 2024, 4 pages.
Exhibit 1011 in Petition for Inter Partes Review of U.S. Pat. No. 11,365,026 Filed Sep. 17, 2024, 16 pages.
Exhibit 1012 in Petition for Inter Partes Review of U.S. Pat. No. 11,365,026 Filed Sep. 17, 2024, 8 pages.
Exhibit 1013 in Petition for Inter Partes Review of U.S. Pat. No. 11,365,026 Filed Sep. 17, 2024, 19 pages.
Exhibit 1014 in Petition for Inter Partes Review of U.S. Pat. No. 11,365,026 Filed Sep. 17, 2024, 35 pages.
Exhibit 1015 in Petition for Inter Partes Review of U.S. Pat. No. 11,365,026 Filed Sep. 17, 2024, 11 pages.
Exhibit 1016 in Petition for Inter Partes Review of U.S. Pat. No. 11,365,026 Filed Sep. 17, 2024, 193 pages.
Exhibit 1017 in Petition for Inter Partes Review of U.S. Pat. No. 11,365,026 Filed Sep. 17, 2024, 29 pages.
Exhibit 1018 in Petition for Inter Partes Review of U.S. Pat. No. 11,365,026 Filed Sep. 17, 2024, 15 pages.
Exhibit 1019 in Petition for Inter Partes Review of U.S. Pat. No. 11,365,026 Filed Sep. 17, 2024, 19 pages.
Exhibit 1020 in Petition for Inter Partes Review of U.S. Pat. No. 11,365,026 Filed Sep. 17, 2024, 18 pages.
Exhibit 1021 in Petition for Inter Partes Review of U.S. Pat. No. 11,365,026 Filed Sep. 17, 2024, 313 pages.
Exhibit 1030 in Petition for Inter Partes Review of U.S. Pat. No. 11,365,026 Filed Sep. 17, 2024, 95 pages.
Exhibit 1031 in Petition for Inter Partes Review of U.S. Pat. No. 11,365,026 Filed Sep. 17, 2024, 5 pages.
Exhibit 1032 in Petition for Inter Partes Review of U.S. Pat. No. 11,365,026 Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in Petition for Inter Partes Review of U.S. Pat. No. 11,794,952 Filed Sep. 17, 2024, 67 pages.
Exhibit 1002 Part 1 in Petition for Inter Partes Review of U.S. Pat. No. 11,794,952 Filed Sep. 17, 2024, 227 pages.
Exhibit 1002 Part 2 in Petition for Inter Partes Review of U.S. Pat. No. 11,794,952 Filed Sep. 17, 2024, 278 pages.
Exhibit 1003 in Petition for Inter Partes Review of U.S. Pat. No. 11,794,952 Filed Sep. 17, 2024, 168 pages.
Exhibit 1004 in Petition for Inter Partes Review of U.S. Pat. No. 11,794,952 Filed Sep. 17, 2024, 17 pages.
Exhibit 1005 in Petition for Inter Partes Review of U.S. Pat. No. 11,794,952 Filed Sep. 17, 2024, 9 pages.
Exhibit 1006 in Petition for Inter Partes Review of U.S. Pat. No. 11,794,952 Filed Sep. 17, 2024, 21 pages.
Exhibit 1007 in Petition for Inter Partes Review of U.S. Pat. No. 11,794,952 Filed Sep. 17, 2024, 16 pages.

(56) References Cited

OTHER PUBLICATIONS

Exhibit 1008 in Petition for Inter Partes Review of U.S. Pat. No. 11,794,952 Filed Sep. 17, 2024, 31 pages.
Exhibit 1009 in Petition for Inter Partes Review of U.S. Pat. No. 11,794,952 Filed Sep. 17, 2024, 6 pages.
Exhibit 1010 in Petition for Inter Partes Review of U.S. Pat. No. 11,794,952 Filed Sep. 17, 2024, 4 pages.
Exhibit 1011 in Petition for Inter Partes Review of U.S. Pat. No. 11,794,952 Filed Sep. 17, 2024, 16 pages.
Exhibit 1012 in Petition for Inter Partes Review of U.S. Pat. No. 11,794,952 Filed Sep. 17, 2024, 8 pages.
Exhibit 1013 in Petition for Inter Partes Review of U.S. Pat. No. 11,794,952 Filed Sep. 17, 2024, 19 pages.
Exhibit 1014 in Petition for Inter Partes Review of U.S. Pat. No. 11,794,952 Filed Sep. 17, 2024, 35 pages.
Exhibit 1015 in Petition for Inter Partes Review of U.S. Pat. No. 11,794,952 Filed Sep. 17, 2024, 11 pages.
Exhibit 1016 in Petition for Inter Partes Review of U.S. Pat. No. 11,794,952 Filed Sep. 17, 2024, 193 pages.
Exhibit 1017 in Petition for Inter Partes Review of U.S. Pat. No. 11,794,952 Filed Sep. 17, 2024, 29 pages.
Exhibit 1018 in Petition for Inter Partes Review of U.S. Pat. No. 11,794,952 Filed Sep. 17, 2024, 15 pages.
Exhibit 1019 in Petition for Inter Partes Review of U.S. Pat. No. 11,794,952 Filed Sep. 17, 2024, 19 pages.
Exhibit 1020 in Petition for Inter Partes Review of U.S. Pat. No. 11,794,952 Filed Sep. 17, 2024, 18 pages.
Exhibit 1021 in Petition for Inter Partes Review of U.S. Pat. No. 11,794,952 Filed Sep. 17, 2024, 313 pages.
Exhibit 1022 in Petition for Inter Partes Review of U.S. Pat. No. 11,794,952 Filed Sep. 17, 2024, 324 pages.
Exhibit 1023 in Petition for Inter Partes Review of U.S. Pat. No. 11,794,952 Filed Sep. 17, 2024, 5 pages.
Exhibit 1024 in Petition for Inter Partes Review of U.S. Pat. No. 11,794,952 Filed Sep. 17, 2024, 7 pages.
Exhibit 1025 in Petition for Inter Partes Review of U.S. Pat. No. 11,794,952 Filed Sep. 17, 2024, 15 pages.
Exhibit 1026 in Petition for Inter Partes Review of U.S. Pat. No. 11,794,952 Filed Sep. 17, 2024, 37 pages.
Exhibit 1027 in Petition for Inter Partes Review of U.S. Pat. No. 11,794,952 Filed Sep. 17, 2024, 7 pages.
Exhibit 1028 in Petition for Inter Partes Review of U.S. Pat. No. 11,794,952 Filed Sep. 17, 2024, 33 pages.
Exhibit 1030 in Petition for Inter Partes Review of U.S. Pat. No. 11,794,952 Filed Sep. 17, 2024, 95 pages.
Exhibit 1031 in Petition for Inter Partes Review of U.S. Pat. No. 11,794,952 Filed Sep. 17, 2024, 5 pages.
Exhibit 1032 in Petition for Inter Partes Review of U.S. Pat. No. 11,794,952 Filed Sep. 17, 2024, 60 pages.

* cited by examiner

COUPLING MECHANISM FOR A MODULAR SYSTEM

CROSS-REFERENCE TO RELATED PATENT APPLICATION

The present application is a continuation of International Application No. PCT/US2022/080020, filed Nov. 17, 2022, which claims the benefit of and priority to U.S. Provisional Application No. 63/280,923, filed on Nov. 18, 2021, which is incorporated herein by reference in its entirety.

BACKGROUND OF THE INVENTION

The present disclosure is directed generally to the field of containers and related devices. The present disclosure relates specifically to a coupling mechanism for use with a modular system, such as a modular storage system.

Tool storage units are often used to transport tools and tool accessories. Some storage units are designed to incorporate into a modular storage system. Various accessories can be configured to interface with a storage unit in a modular storage system, such as smaller containers that couple to units within the modular storage system.

SUMMARY OF THE INVENTION

One embodiment of the invention relates to a coupling mechanism configured to mechanically engage and disengage a coupling structure. The coupling mechanism includes a housing defining a lower surface, a projection extending downward from the lower surface of the housing, and a plurality of arms extending away from the projection. The plurality of arms are coupled to the projection such that the arms actuate between an engagement position in which the plurality of arms extend upward and away from the projection, a disengagement position in which the plurality of arms extend downward and away from the projection, and a locked position between the engagement position and the disengagement position.

In various embodiments, the coupling mechanism includes a tension mechanism that, when actuated, releases the arms from the locked position thereby permitting the arms to pivot into the disengagement position. In various embodiments, the coupling mechanism includes a button that extends upward from an upper surface of the housing opposite the lower surface, the button actuating the tension mechanism. In various embodiments, the tension mechanism biases the arms to remain in the locked position until the button is actuated. In various embodiments, the plurality of arms include at least four arms extending away from the projection and circumferentially surrounding the projection. In various embodiments, the plurality of arms define a plurality of outer surfaces that collectively circumferentially extend at least 250 degrees around the projection. In various embodiments, the plurality of arms include at least four arms extending away from the projection and circumferentially surrounding the projection.

Another embodiment of the invention relates to a coupling mechanism configured to mechanically engage and disengage a coupling structure. The coupling mechanism includes a housing defining a lower surface, a projection extending downward from the lower surface of the housing, and a plurality of arms. Each of the plurality of arms extend away from the projection from an inner end closest to the projection to an opposing outer surface furthest from the projection. The plurality of arms actuate between an engagement position in which a first outer surface of a first arm of the plurality of arms defines a first distance from the lower surface, a disengagement position in which the first outer surface of the first arm defines a second distance greater than the first distance, and a locked position in which the first outer surface of the first arm defines a third distance greater than the first distance and less than the second distance.

In various embodiments, the plurality of arms define a plurality of outer surfaces that collectively circumferentially extend at least 270 degrees around the projection. In various embodiments, the plurality of arms include at least four arms extending away from the projection and circumferentially surrounding the projection. In various embodiments, the coupling mechanism includes a tension mechanism that, when actuated, releases the arms from the locked position thereby permitting the arms to pivot into the disengagement position.

Another embodiment of the invention relates to a coupling system including an object and a coupling mechanism coupled to the object. The coupling mechanism includes a housing defining a lower surface facing away from the utility module, a projection extending downward from the lower surface of the housing, a plurality of arms extending away from the projection, and a button that, when actuated, permits the plurality of arms to transition from the locked position to the disengagement position. The plurality of arms are coupled to the projection such that the arms actuate between a disengagement position in which the plurality of arms extend downward and away from the projection, and a locked position in which the plurality of arms extend laterally away from the projection.

In various embodiments, the plurality of arms define a plurality of outer surfaces that collectively circumferentially extend at least 270 degrees around the projection. In various embodiments, the coupling mechanism includes a tension mechanism that, when actuated, releases the arms from the locked position thereby permitting the arms to pivot into the disengagement position. In various embodiments, the coupling mechanism includes a button coupled to the projection, the button actuating the tension mechanism.

Another embodiment of the invention relates to a coupling mechanism configured to mechanically engage and disengage a coupling structure on a modular unit. The coupling mechanism includes a housing defining a lower surface, a projection extending downward from the lower surface of the housing, and a plurality of arms that extend away from the projection. The plurality of arms are coupled to the projection such that the arms actuate between an engagement position in which the arms extend away from the projection and upward towards the housing, a disengagement position in which the arms extend away from the projection and downwards away from the housing, and a locked position in which the arms are oriented between the engagement position and the disengagement position.

In various embodiments the coupling mechanism includes an interface that, when actuated, releases the arms from the locked position thereby permitting the arms to pivot into the disengagement position. In various embodiments, the interface includes a button that extends upward from an upper surface of the housing opposite the lower surface. In various embodiments, the coupling mechanism includes a tension mechanism coupled to the button. The tension mechanism biases the arms to remain in the locked position until the interface is actuated.

In various embodiments, the coupling mechanism includes at least four arms extending away from the projection and circumferentially surrounding the projection. In various embodiments, a first arm of the plurality of arms includes an end furthest from the projection. When the arm is in the engagement position the end of the arm defines a first distance from the lower surface of the housing. When the arm is in the locked position the end of the arm defines a second distance from the lower surface of the housing that is further than the first distance. When the arm is in the disengagement position the end of the arm defines a third distance from the lower surface of the housing that is further than the second distance.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
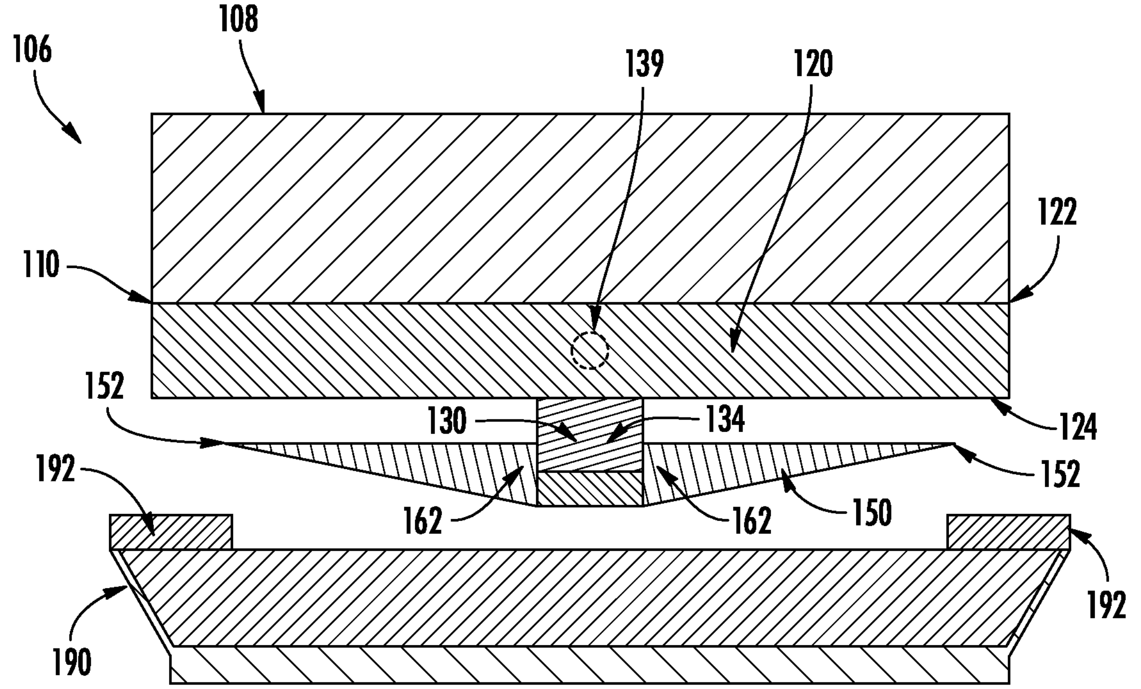
FIG. 1 is a schematic side cross-section view of a coupling mechanism, according to an exemplary embodiment.
Figure 2:
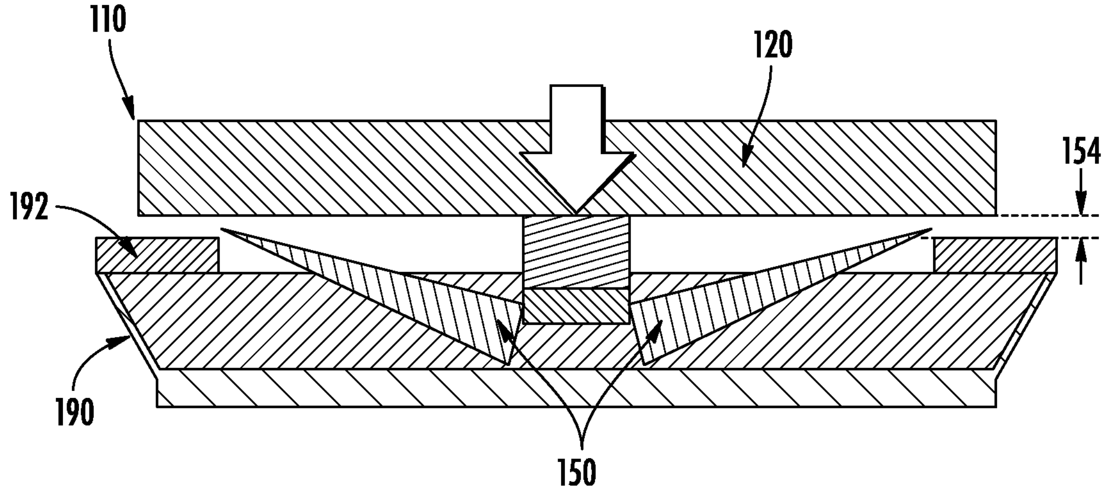
FIG. 2 is a schematic side cross-section view of the coupling mechanism of FIG. 1, according to an exemplary embodiment.
Figure 3:
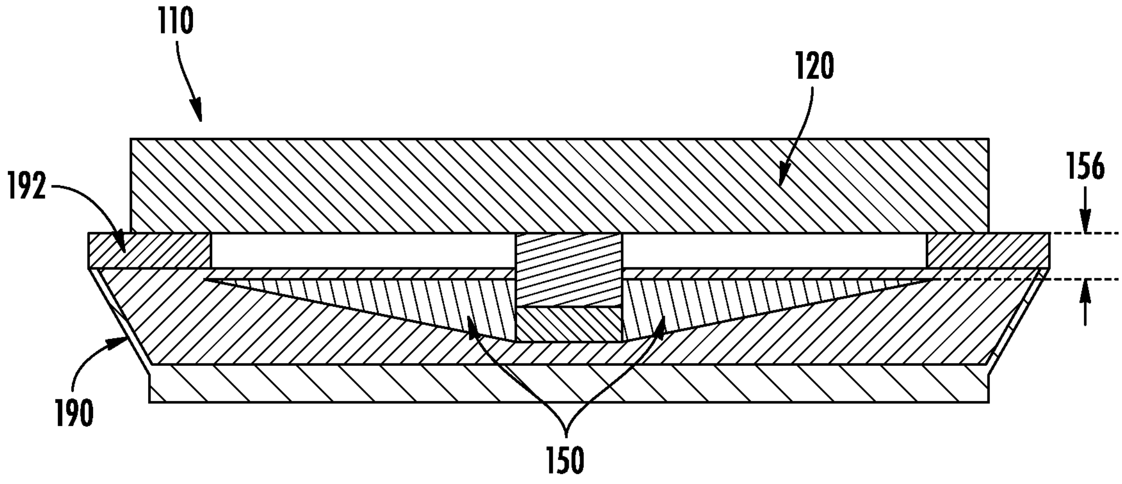
FIG. 3 is a schematic side cross-section view of the coupling mechanism of FIG. 1, according to an exemplary embodiment.

Referring generally to the figures, various embodiments of a coupling mechanism mechanically engage and disengage with a modular utility module are shown. The coupling mechanism is configured to selectively couple and decouple with units in a modular system, such as a tool storage unit. The coupling mechanism includes an interface to couple to one or more coupling recesses of the tool storage unit. The coupling mechanism provides the ability to quickly couple and decouple utility modules to a modular system.

When coupled to the tool storage unit, the coupling mechanism is biased to remain coupled to the tool storage unit when the tool storage unit is being moved, such as being moved around a construction site. In specific embodiments, the coupling mechanism includes arms that actuate vertically to engage or disengage with a coupling pocket.

Referring to FIGS. 1-5, a device to couple a container, unit, device, and/or utility module, shown as coupling mechanism 110, is shown according to an exemplary embodiment. Coupling mechanism 110 is configured to mechanically engage and disengage a coupling structure, such as pocket 190 with ribs. Coupling mechanism 110 includes a housing 120, which includes an upper surface 122 and an opposing lower surface 124. In various embodiments housing 120 is coupled to another object, such as an object to be coupled to the coupling pocket 190 of a utility module.

In various embodiments, coupling system 106 includes object 108 and coupling mechanism 110 coupled to the object 108. The coupling mechanism 110 is coupled to the utility module, such as detachably coupled. The coupling mechanism 110 facilitates securing the object 108 to units in a modular system. In various embodiments, object 108 is a tool, such as a tape measure.

In various embodiments, coupling mechanism 110 is initially independent of an object (e.g., battery, battery housing, cup, and/or a tool, shown as object 108) to be coupled to a utility module, and the coupling mechanism 110 and the object are subsequently coupled together before coupling mechanism 110 is then coupled to a utility module (thereby also coupling the object to the utility module). In various embodiments, coupling mechanism 110 is formed as part of the object and/or coupled to the object before reaching a consumer, and coupling mechanism 110 is used to engage the object to a utility module.

Coupling mechanism 110 includes projection 130 that extends downward from lower surface 124 of housing 120. Coupling mechanism 110 includes a plurality of arms 150 coupled to projection 130 and extending away from projection 130, such as laterally and/or radially away from projection 130. In various embodiments, each of the plurality of arms 150 extend away from the projection 130 from an inner end 162 closest to the projection 130 to an opposing outer surface 152 (e.g., ends of arms 150) furthest from the projection 130. The plurality of arms 150 are coupled to the projection 130 such that the arms 150 actuate between an engagement position in which the plurality of arms 150 extend upward and away from the projection 130, a disengagement position in which the plurality of arms 150 extend downward and away from the projection 130, and a locked position between the engagement position and the disengagement position. In various embodiments, the arms 150 are arranged around the projection 130 symmetrically with respect to each other.

An interface element, shown as button 134 is coupled to projection 130 and is actuated to adjust an position of arms 150 with respect to projection 130. Stated another way, button 134 extends upward from an upper surface 122 of the housing 120 opposite the lower surface 124, the button 134 actuating the tension mechanism 139. In various embodiments, the button 134 is coupled to projection 130, and the button 134 actuates the tension mechanism 139. In various embodiments, the tension mechanism 139 biases the arms 150 to remain in the locked position until the button 134 is actuated. Stated another way, coupling mechanism 110 includes a button 134 that, when actuated, permits the plurality of arms 150 to transition from the locked position to the disengagement position.

Figure 4:
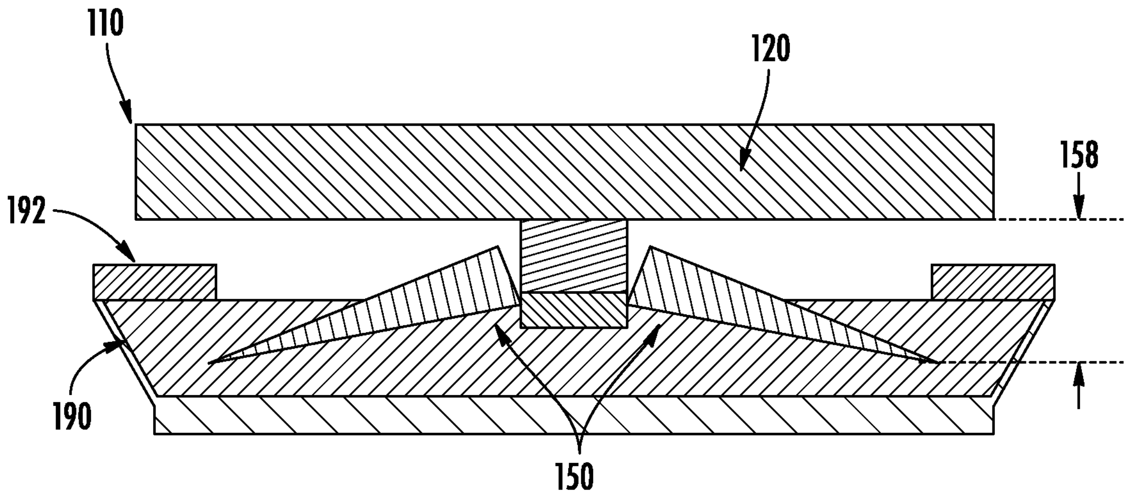
FIG. 4 is a schematic side cross-section view of the coupling mechanism of FIG. 1, according to an exemplary embodiment.
Figures 5, 6, 7, 8, 9, 10:
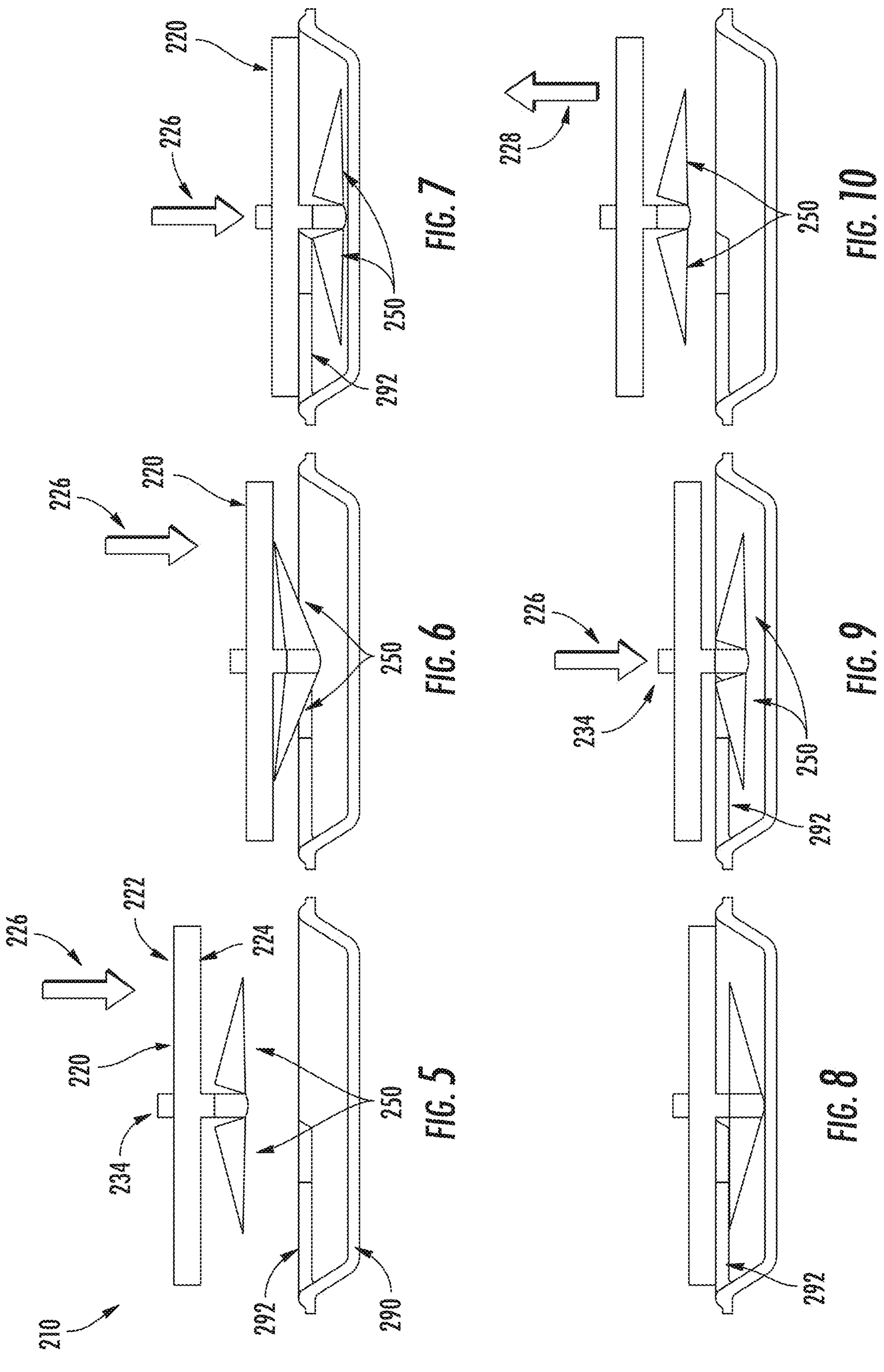
FIG. 5 is a schematic side view of a coupling mechanism, according to an exemplary embodiment.
FIG. 6 is a schematic side view of the coupling mechanism of FIG. 5, according to an exemplary embodiment.
FIG. 7 is a schematic side view of the coupling mechanism of FIG. 5, according to an exemplary embodiment.
FIG. 8 is a schematic side view of the coupling mechanism of FIG. 5, according to an exemplary embodiment.
FIG. 9 is a schematic side view of the coupling mechanism of FIG. 5, according to an exemplary embodiment.
FIG. 10 is a schematic side view of the coupling mechanism of FIG. 5, according to an exemplary embodiment.

As will be shown, arms 150 selectively engage, lock, and disengage with ribs 192 of coupling pocket 190. In particular, arms 150 actuate between an engagement position with respect to projection 130 (FIG. 2), a locked position (FIG. 3), and a disengagement position (FIG. 4). In various embodiments, plurality of arms 150 include at least four arms 150 extending away from the projection 130 and circumferentially surrounding the projection 130. In various embodiments, the plurality of arms 150 defining a plurality of outer surfaces 152 that collectively circumferentially extend at least 250 degrees around the projection 130 (also see FIG. 11).

Coupling mechanism 110 includes a tension mechanism 139 that, when actuated, releases the arms 150 from the locked position thereby permitting the arms to pivot into the disengagement position. Various embodiments of tension mechanisms 140, 240, which coupling mechanism 110 may include, are described below in regard to FIGS. 14 and 15. In various embodiments the tension mechanism actuates between holding the arms rigidly against the projection (e.g., such as when in the locked position) and permitting the arms to pivot with respect to the rotation (e.g., such as when in the engagement or disengagement positions).

When in the engagement position, the arms 150 are folded upward towards lower surface 124. In particular, as coupling mechanism 110 is coupled to coupling pocket 190, outer surfaces 152 of the one or more arms 150 pivot upward towards lower surface 124 until outer surfaces 152 are distance 154 from lower surface 124.

When in the locked position, the arms 150 extend laterally from projection 130 and engage against the underside of ribs 192 to secure coupling mechanism with coupling pocket 190. In particular, once arms 150 are disposed within coupling pocket 190, outer surfaces 152 of arms 150 pivot beneath ribs 192 of coupling pocket such that outer surfaces 152 are distance 156 from lower surface 124, and distance 156 is further than distance 154.

When in the disengagement position, the arms 150 are folded downward away from lower surface 124. In particular, to remove coupling mechanism 110 from coupling pocket 190, button 134 is actuated to permit arms 150 to pivot with respect to projection 130 such that outer surfaces 152 of arms 150 pivot to distance 158 from lower surface 124, and distance 158 is further than both distance 154 and distance 156.

Stated another way, the plurality of arms 150 actuate between an engagement position (FIG. 2) in which a first outer surface 152 of a first arm 150 of the plurality of arms 150 defines a first distance 154 from the lower surface 124, a disengagement position (FIG. 4) in which the first outer surface 152 of the first arm 150 defines a second distance 158 greater than the first distance 154, and a locked position (FIG. 3) in which the first outer surface 152 of the first arm 150 defines a third distance 156 greater than the first distance 154 and less than the second distance 158.

Referring to FIGS. 5-13, coupling mechanism 210 is shown according to an exemplary embodiment. Coupling mechanism 210 is substantially the same as coupling mechanism 110 except for the differences discussed herein. In particular, button 234 extends upwards from housing 220.

Housing 220 includes upper surface 222 and an opposing lower surface 224. To engage coupling mechanism 210 with coupling pocket 290, coupling mechanism 210 is moved in direction 226 towards coupling pocket 290. Arms 250 of coupling mechanism 210 pivot towards lower surface 224 as coupling mechanism 210 is inserted into coupling pocket 290. Subsequently, arms 250 engage ribs 292 to secure coupling mechanism 210 within coupling pocket 290. To remove coupling mechanism 210, first button 234 is actuated to permit arms 250 to pivot downward, and then coupling mechanism 210 is moved upward in direction 238.

Figure 11:
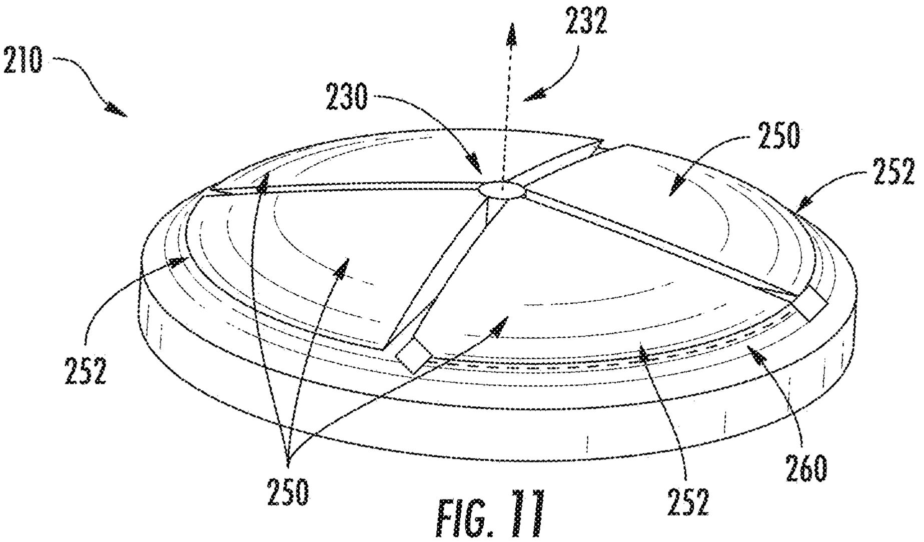
FIG. 11 is a perspective view of the coupling mechanism of FIG. 5, according to an exemplary embodiment.
Figure 12:
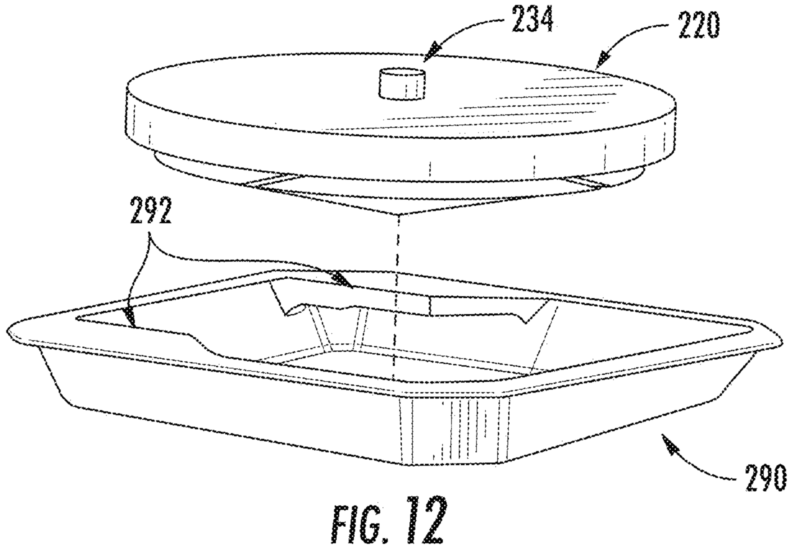
FIG. 12 is a perspective view of the coupling mechanism of FIG. 5 above a coupling pocket, according to an exemplary embodiment.
Figure 13:
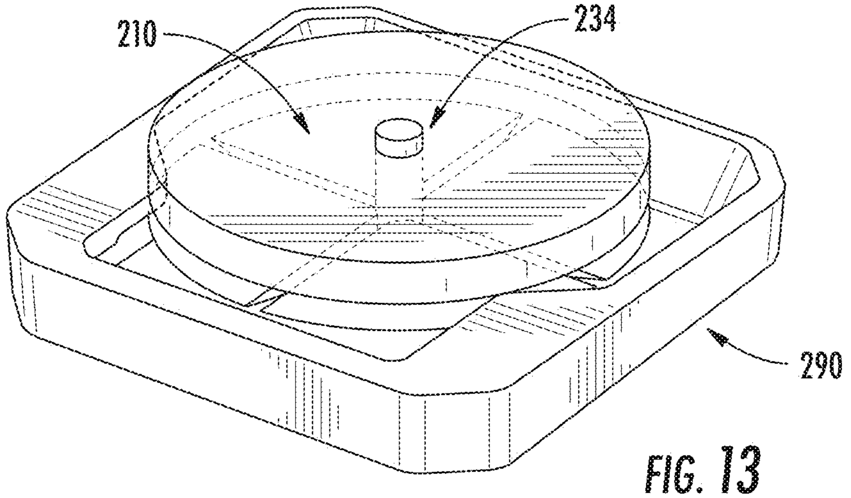
FIG. 13 is a perspective ghost view of the coupling mechanism of FIG. 5 disposed within a coupling pocket, according to an exemplary embodiment.

Referring to FIGS. 11-13, as shown coupling mechanism 210 includes four arms 250. Each arm 250 circumferentially extends angle 260 around projection 230 between 70 degrees and 90 degrees with respect to longitudinal axis 232, and more specifically 80 degrees. In various embodiments, the plurality of arms 150 a plurality of outer surfaces 252 that collectively circumferentially extend at least 250 degrees around the projection 130, and more specifically at least 270 degrees around the projection 130.

As shown, one or more of arms 250 engage against ribs 292 of coupling pocket 290.

In a specific embodiment, coupling mechanism 110 and coupling mechanism 210 are compatible with the coupling mechanism(s) described in International Patent International Patent Publication No. WO 2017/191628, which is incorporated herein by reference in its entirety.

Figure 14:
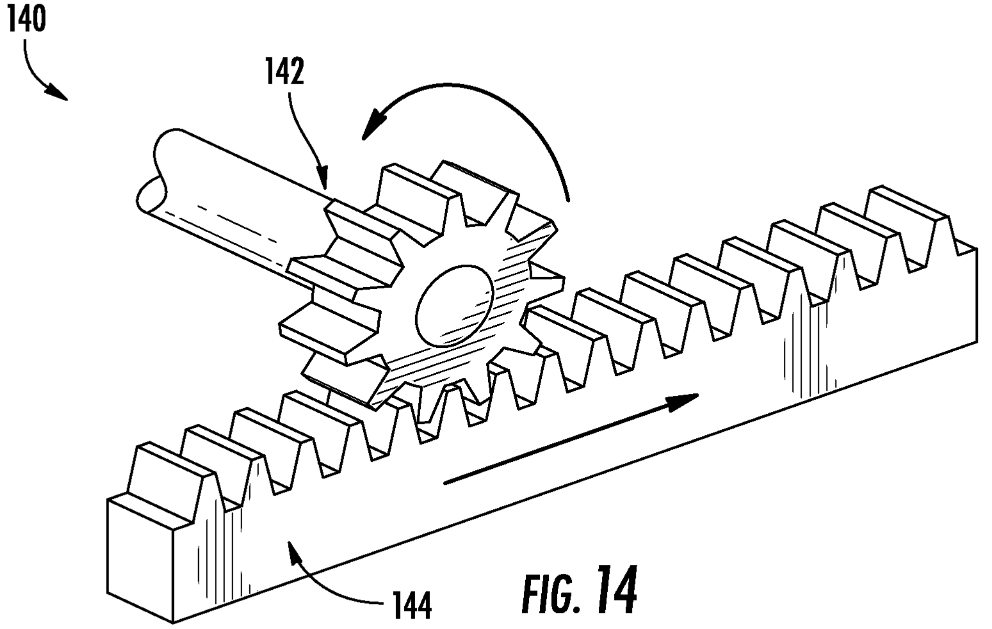
FIG. 14 is a perspective view of a tension mechanism, according to an exemplary embodiment.

Referring to FIG. 14, various aspects of tension mechanism 140 are shown. Tension mechanism 140 is configured to actuate between rigidly engaging the arms against the projection of a coupling mechanism and thereby locking the arms under the ribs of a coupling pocket, and permitting the arms to pivot with respect to the projection. As shown, tension mechanism 140 includes a pinion gear 142 with teeth that engage with teeth of rack gear 144.

Figure 15:
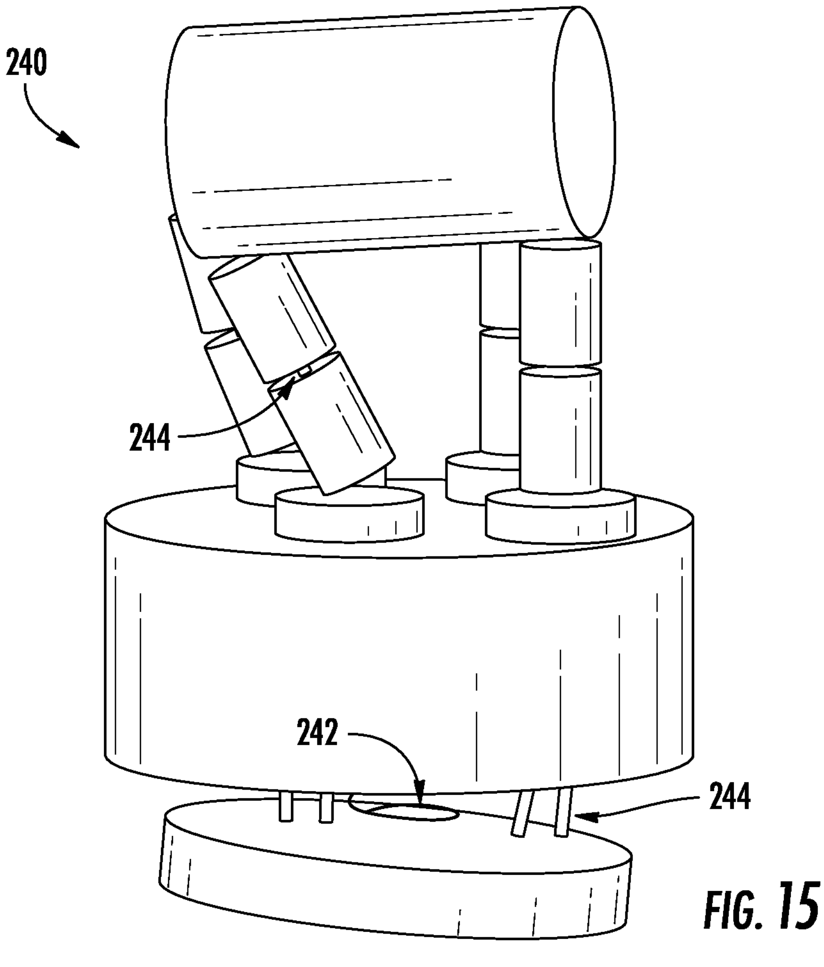
FIG. 15 is a perspective view of a tension mechanism, according to an exemplary embodiment.

Referring to FIG. 15, various aspects of tension mechanism 240 are shown. Tension mechanism 240 actuates between rigidly engaging arms against the projection of a coupling mechanism and thereby locking the arms under the ribs of a coupling pocket, and permitting the arms to pivot with respect to the projection. As shown, tension mechanism 240 includes a biasing element, shown as spring 242, that maintains tension in a flexible elongate structure 244. In use, a user presses against spring 242 to remove tension in flexible elongate structure 244, thereby permitting the arms to pivot with respect to the projection. To secure arms beneath ribs, the user stops pressing against spring 242 and in response flexible elongate structure 244 are tightened to bias arms against the projection, thereby securing the arms under the ribs of a coupling pocket.

Figure 16:
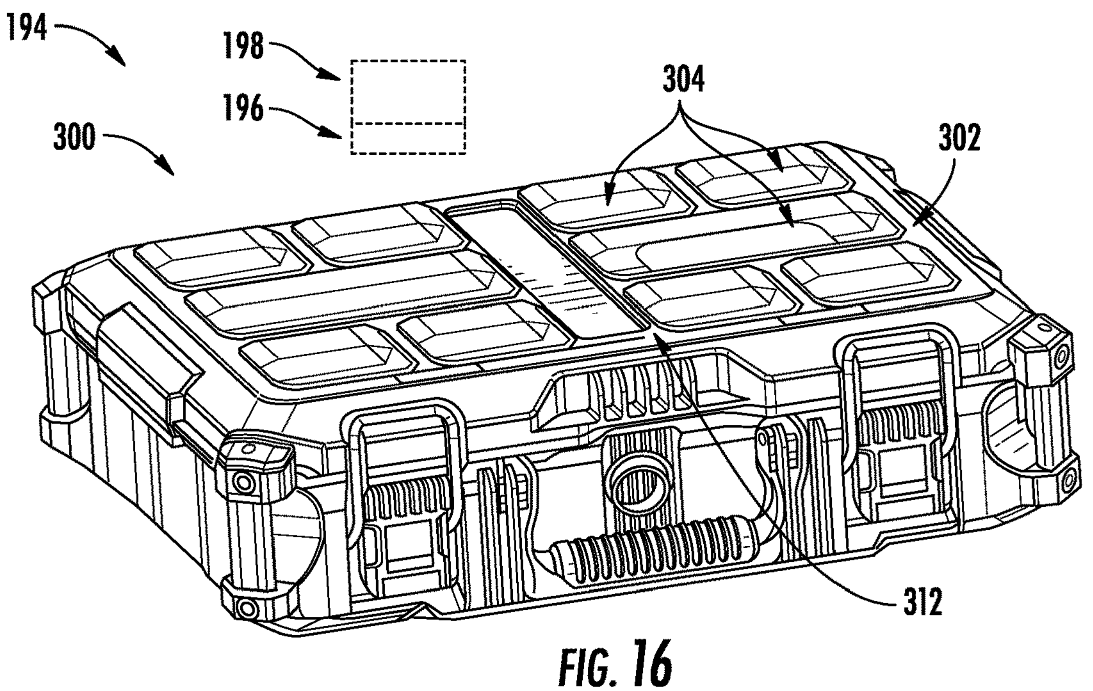
FIG. 16 is a perspective view from above of a utility module, according to an exemplary embodiment.
Figure 17:
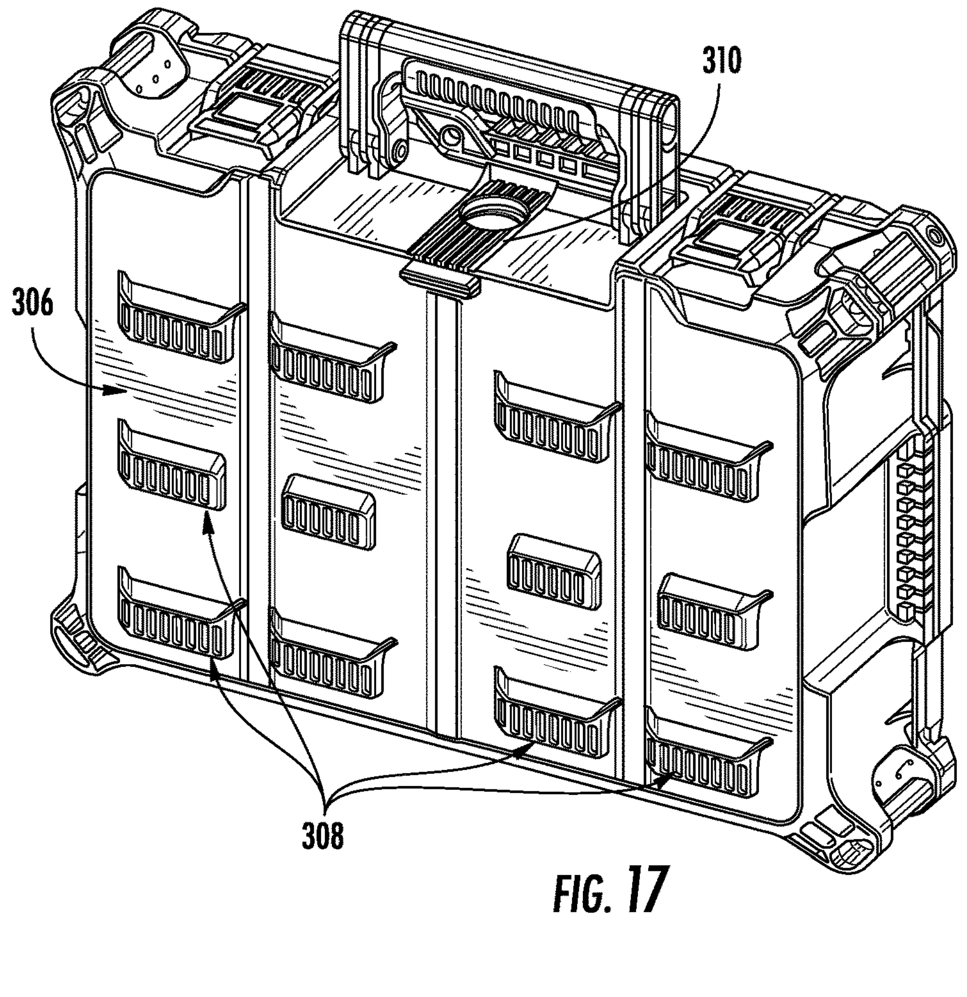
FIG. 17 is a perspective view from below of the utility module of FIG. 16, according to an exemplary embodiment.

Referring to FIGS. 16-17, various aspects of utility module 300 are shown, according to an exemplary embodiment. As will be understood, coupling mechanism 110 is configured to couple an object to utility module 300. Utility module 300 includes an upper surface 302 and an opposing lower surface 306 facing away from the upper surface 302. One or more female couplers 304 extend from and/or are defined by upper surface 302 of utility module 300, and one or more male couplers 308 extend from lower surface 306 of utility module 300. Utility module 300 includes a latch 310 and a latch recess 312 configured to interface with latch recesses and latches, respectively, to secure utility module 300 to other objects.

Female couplers 304 of utility module 300 detachably engage with coupling mechanism 110. In various embodiments, a system 194 includes utility module 300 including utility module 300 and object 198 coupled to utility module 300. Object 198 is coupled, such as detachably coupled, to coupler 196. Coupler 196 may be any of the couplers shown (e.g., coupling mechanism 110, coupling mechanism 210). Coupler 196 is reversibly and detachably mechanically coupled to one of female couplers 304.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A coupling mechanism configured to mechanically engage and disengage a coupling structure, the coupling mechanism comprising:

a housing defining a lower surface;

a projection extending downward from the lower surface of the housing; and a plurality of arms extending away from the projection, the plurality of arms configured to detachably couple the coupling mechanism with ribs of the coupling structure, the plurality of arms coupled to the projection such that the arms actuate between:

an engagement position in which the plurality of arms extend upward and away from the projection;

a disengagement position in which the plurality of arms extend downward and away from the projection;

a locked position between the engagement position and the disengagement position, wherein the plurality of arms move through the locked position when transitioning from the engagement position to the disengagement position, and wherein when the arms are in the locked position the ribs are between the arms and the housing to thereby couple the coupling mechanism to the coupling structure; and a tension mechanism that, when actuated, releases the arms from the locked position thereby permitting the arms to pivot into the disengagement position.

2. The coupling mechanism of claim 1, comprising a button that extends upward from an upper surface of the housing opposite the lower surface, the button actuating the tension mechanism.

3. The coupling mechanism of claim 1, comprising a button coupled to the projection, the button actuating the tension mechanism.

4. The coupling mechanism of claim 3, wherein the tension mechanism biases the arms to remain in the locked position until the button is actuated.

5. The coupling mechanism of claim 1, the plurality of arms comprising at least four arms extending away from the projection and circumferentially surrounding the projection.

6. The coupling mechanism of claim 1, the plurality of arms defining a plurality of outer surfaces that collectively circumferentially extend at least 250 degrees around the projection.

7. The coupling mechanism of claim 6, the plurality of arms comprising at least four arms extending away from the projection and circumferentially surrounding the projection.

8. A coupling mechanism configured to mechanically engage and disengage a coupling structure, the coupling mechanism comprising:
- a housing defining a lower surface;
- a projection extending downward from the lower surface of the housing;
- a plurality of arms, each of which extend away from the projection from an inner end closest to the projection to an opposing outer surface furthest from the projection, the plurality of arms configured to detachably couple the coupling mechanism with ribs of the coupling structure, the plurality of arms actuating between an engagement position in which a first outer surface of a first arm of the plurality of arms defines a first distance from the lower surface, a disengagement position in which the first outer surface of the first arm defines a second distance greater than the first distance, and a locked position in which the first outer surface of the first arm defines a third distance greater than the first distance and less than the second distance, wherein when the arms are in the locked position the ribs are between the arms and the housing to thereby couple the coupling mechanism to the coupling structure, wherein the plurality of arms move through the locked position when transitioning from the engagement position to the disengagement position; and
- a tension mechanism that, when actuated, releases the arms from the locked position thereby permitting the arms to pivot into the disengagement position.

9. The coupling mechanism of claim 8, the plurality of arms defining a plurality of outer surfaces that collectively circumferentially extend at least 270 degrees around the projection.

10. The coupling mechanism of claim 9, the plurality of arms comprising at least four arms extending away from the projection and circumferentially surrounding the projection.

11. The coupling mechanism of claim 8, comprising a button that extends upward from an upper surface of the housing opposite the lower surface, the button actuating the tension mechanism.

12. The coupling mechanism of claim 8, comprising a button coupled to the projection, the button actuating the tension mechanism.

13. The coupling mechanism of claim 8, the arms are arranged around the projection symmetrically with respect to each other.

14. A coupling system comprising:
- an object; and
- a coupling mechanism coupled to the object, the coupling mechanism comprising:
  - a housing defining a lower surface facing away from the object;
  - a projection extending downward from the lower surface of the housing;
  - a plurality of arms extending away from the projection, the plurality of arms configured to detachably couple the coupling mechanism with ribs of a coupling structure, the plurality of arms coupled to the projection such that the arms actuate between a disengagement position in which the plurality of arms extend downward and away from the projection, an engagement position in which the plurality of arms extend upward and away from the projection, and a locked position in which the plurality of arms extend laterally away from the projection, wherein when the arms are in the locked position the ribs are between the arms and the housing to thereby couple the coupling mechanism to the coupling structure, wherein the plurality of arms move through the locked position when transitioning from the engagement position to the disengagement position;
- a button that, when actuated, permits the plurality of arms to transition from the locked position to the disengagement position; and
- a tension mechanism that, when actuated, releases the arms from the locked position thereby permitting the arms to pivot into the disengagement position.

15. The coupling mechanism of claim 14, the plurality of arms defining a plurality of outer surfaces that collectively circumferentially extend at least 270 degrees around the projection.

16. The coupling mechanism of claim 14, wherein the button is coupled to the projection, the button actuating the tension mechanism.

* * * * *